United States Patent
Henry et al.

(10) Patent No.: US 7,180,876 B1
(45) Date of Patent: Feb. 20, 2007

(54) MOBILE DEVICE HAVING NETWORK INTERFACE SELECTION

(75) Inventors: Paul Shala Henry, Holmdel, NJ (US); Byoung-Jo J Kim, Jersey City, NJ (US); Kin K Leung, Edison, NJ (US); Bruce Edwin McNair, Holmdel, NJ (US)

(73) Assignee: AT&T Corp., New York, NY (US)

( * ) Notice: Subject to any disclaimer, the term of this patent is extended or adjusted under 35 U.S.C. 154(b) by 1093 days.

(21) Appl. No.: 10/145,973

(22) Filed: May 14, 2002

Related U.S. Application Data

(60) Provisional application No. 60/290,787, filed on May 14, 2001.

(51) Int. Cl.
*H04Q 7/20* (2006.01)

(52) U.S. Cl. ...................... 370/329; 370/348
(58) Field of Classification Search ............... 370/332, 370/331, 333, 338; 455/435.1–435
See application file for complete search history.

(56) References Cited

U.S. PATENT DOCUMENTS

| 5,825,759 A | 10/1998 | Liu |
| 6,104,712 A | 8/2000 | Robert et al. |
| 6,256,300 B1 | 7/2001 | Ahmed et al. |
| 6,990,082 B1* | 1/2006 | Zehavi et al. ............... 370/280 |
| 2001/0055298 A1 | 12/2001 | Baker et al. |
| 2002/0136183 A1* | 9/2002 | Chen et al. ................. 370/338 |
| 2002/0155831 A1* | 10/2002 | Fodor et al. ............... 455/426 |
| 2002/0197992 A1* | 12/2002 | Nizri et al. ................. 455/435 |

FOREIGN PATENT DOCUMENTS

| WO | 98/57510 | 12/1998 |
| WO | 99/55030 | 10/1999 |
| WO | 00/28752 | 5/2000 |
| WO | 00/38465 | 6/2000 |
| WO | 01/19050 A3 | 3/2001 |

* cited by examiner

*Primary Examiner*—Hassan Kizou
*Assistant Examiner*—Salman Ahmed

(57) ABSTRACT

An access interface module includes a first network interface module for interfacing with a first access network and a second network interface module for interfacing with a second access network of a type that is different from the first network. The access module can further include a processor coupled to the first and second network interface modules and a device interface module coupled to the processor for interfacing with a host device.

3 Claims, 5 Drawing Sheets

MOBILE DEVICE HAVING NETWORK INTERFACE SELECTION

CROSS REFERENCE TO RELATED APPLICATIONS

The present application claims the benefit of U.S. Provisional Patent Application No. 60/290,787, filed on May 14, 2001, which is incorporated herein by reference.

STATEMENT REGARDING FEDERALLY SPONSORED RESEARCH

Not Applicable.

FIELD OF THE INVENTION

The present invention relates generally to communication networks and, more particularly, to mobile devices communicating with wireless networks.

BACKGROUND OF THE INVENTION

As is known in the art, there are a variety of devices, signal formats, and protocols that can provide wireless access to a network. For example, cell phones use an air interface to communicate with a base station, which is ultimately coupled to land lines and other networks. Wireless devices for accessing various networks are also increasing in popularity. Currently, there are many different types of wireless devices having assorted air interface technologies. However, each device is typically limited to a particular type of wireless interface and network.

Some attempts have been made to address air interface incompatibilities. For example, dual-mode cellular phones enable switching between two different frequency bands (e.g., cellular 850 and PCS 1900 MHz bands) when a user moves from a cell served by one band into another cell served by the other band. Such devices use one transceiver to measure the channel quality in terms of received signal strength for the frequency bands in accordance with the corresponding industry standard specifications. Thus, the ability to measure alternative channels is quite limited.

It would, therefore, be desirable to overcome the aforesaid and other disadvantages.

SUMMARY OF THE INVENTION

The present invention provides a mobile device having first and second air interfaces to enhance Internet roaming. With this arrangement, the ability to obtain a wireless connection of high link quality is enhanced. While the invention is primarily shown and described in conjunction with certain types of wireless devices and interfaces, it is understood that the invention is applicable to wireless networks and devices in general in which multiple air interfaces are desirable.

In one aspect of the invention, an access interface module includes a first network interface module for interfacing with a first access network and a second network interface module for interfacing with a second access network of a type that is different from the first network. The access module can further include a processor coupled to the first and second network interface modules and a device interface module coupled to the processor for interfacing with a host device, such as a personal digital assistant (PDA).

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
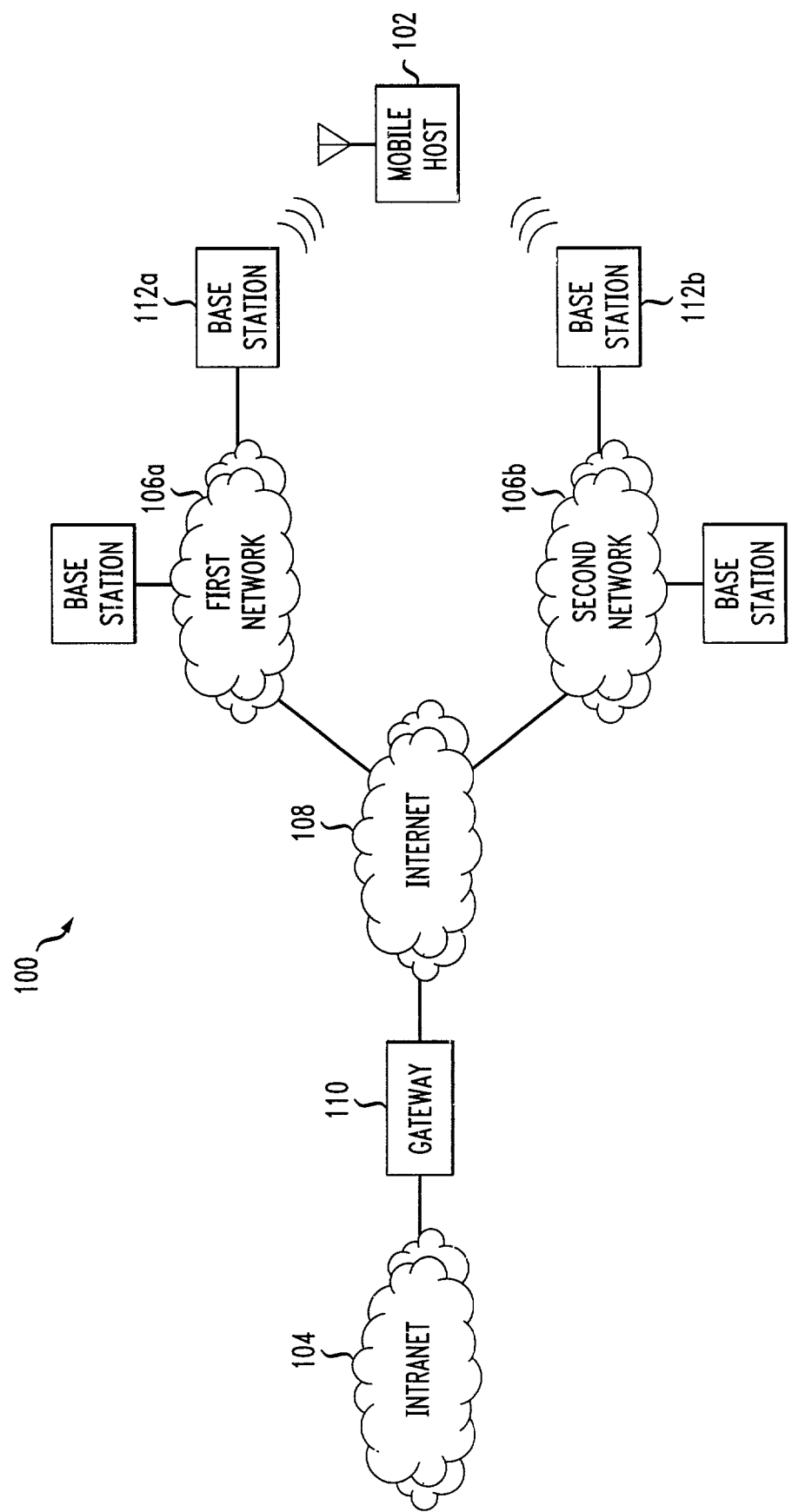
FIG. 1 is a schematic representation of a system providing air interface selection in accordance with the present invention.

FIG. 1 shows an exemplary system 100 enabling a mobile host 102 to connect to a target network 104, such as a corporate intranet, using a selected one of a plurality of access networks 106a,b. Access can be provided via the Internet 108 and target gateway 110 where the first and second access networks 106a,b are coupled to the Internet 108. In the case of Internet-based access using the Internet Protocol (IP), connection to the target network 104 over a selected one of the interfaces 106a,b can be referred to as Internet roaming. In general, the mobile host 102 can use multiple network interfaces, such as base stations 112a,b, each of which enables access to a respective one of the access networks 106a,b.

While the invention is primarily shown and described in conjunction with systems having multiple network interfaces of different wireless technologies, e.g., one GPRS (General Packet Radio Service) interface and one 802.11 WLAN (Wireless Local Area Network), which are not compatible at the physical layer and networking layers, it is understood that the invention is not limited to such embodiments. Exemplary wireless technologies applicable to the present invention include 802.15 Personal Area Network, BlueTooth, Ultra WideBand (UWB), Enhanced Data for GSM Evolution (EDGE), Wideband Code Division Multiple Access (WCDMA), Code Division Multiple Access 2000 (CDMA2000), and the like. These network interfaces are available, or will soon be available, to host devices such as laptop computers, Personal Digital Assistants (PDAs), smart phones, tablet computers, setup boxes, gaming devices, and other vertical application devices.

The mobile device 102 can monitor the channel quality associated with each network interface 112a,b and select a preferred air interface for receiving and transmitting data. To avoid severe interference and coupling effects between interfaces, the mobile device 102 can schedule air interface access to enable probing of the alternate interface without causing any noticeable interruption of data flow on the currently selected interface. While the invention is primarily shown in conjunction with two possible access networks, it is understood that the invention is equally applicable to hosts and systems having more than two access networks that can be selected for use by a given mobile host.

Figure 2:
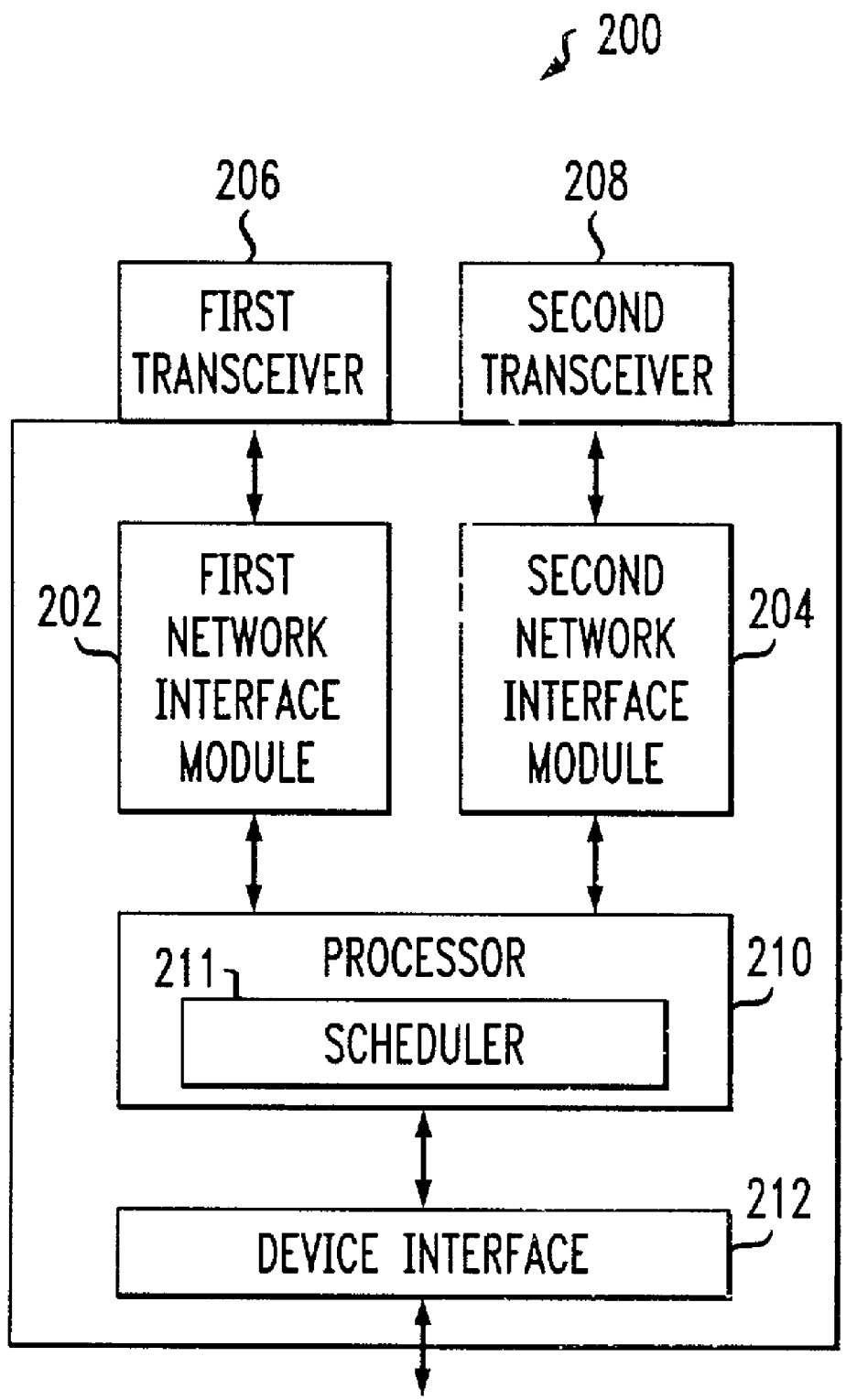
FIG. 2 is a schematic block diagram of a wireless device having multiple air interfaces in accordance with the present invention.

As shown in FIG. 2, an interface selection module 200 providing access selection in accordance with the present invention is insertable within a mobile device, such as the mobile host 102 of FIG. 1. The interface selection module includes first and second network interface modules 202, 204, each of which enables access to a respective one of available access networks via respective first and second transceivers 206, 208. The interface modules 202, 204 interact with a processor 210 that controls the overall operation of the module and interacts with a device interface module 212 that communicates with the host device (not shown). The processor 210 oversees network selection algorithms, which are described in detail below, as well as conventional functionality, such as mobility management, IP tunneling, and other such network activities.

Referring now to FIG. 2 in combination with FIG. 1, the mobile host 102 may roam between the coverage area of the first network 106a, which can be provided as a Third Generation (3G) network, and the coverage area of the second network 106b, which can be provided as a Wireless Local Area Network (WLAN), e.g., an IEEE Standard 802.11b network. The first network interface module 202 enables access to the 3G network 106a and the second network interface module 204 enables access to the WLAN 106b. The processor 210 can include a scheduler 211 that, in conjunction with the first and second network interface modules 202, 204, can determine which network is to be selected at any one time, as well as monitor channel quality to periodically evaluate switching to the other network.

The mobile host 102 monitors channel quality associated with each of the air interfaces 112a, 112b and selects the appropriate interface based upon predetermined parameters, such as highest channel quality. It is understood that if the multiple air interfaces are implemented on the same Printed Circuit (PC) card, or otherwise co-located closely together when they are activated simultaneously, severe interference and coupling effects, referred to as internal interference, can significantly hinder proper interface operations. To avoid interference, the interfaces can be activated at different times as described in detail below.

It is understood that the interface selection module of FIG. 2 can be provided in a variety of configurations to meet the needs of a particular application. For example, the first and second network interface modules can be provided as separate physical modules, e.g., circuit cards, or as a single module. In addition, the transceiver elements can include discrete transmit antennas and discrete receive antennas. Further, the transceiver elements for each of the interface modules can have varying levels of integration. In one particular embodiment, a single circuit card, which is insertable into a mobile host device, contains circuitry for the first and second network interface modules.

Figure 3:
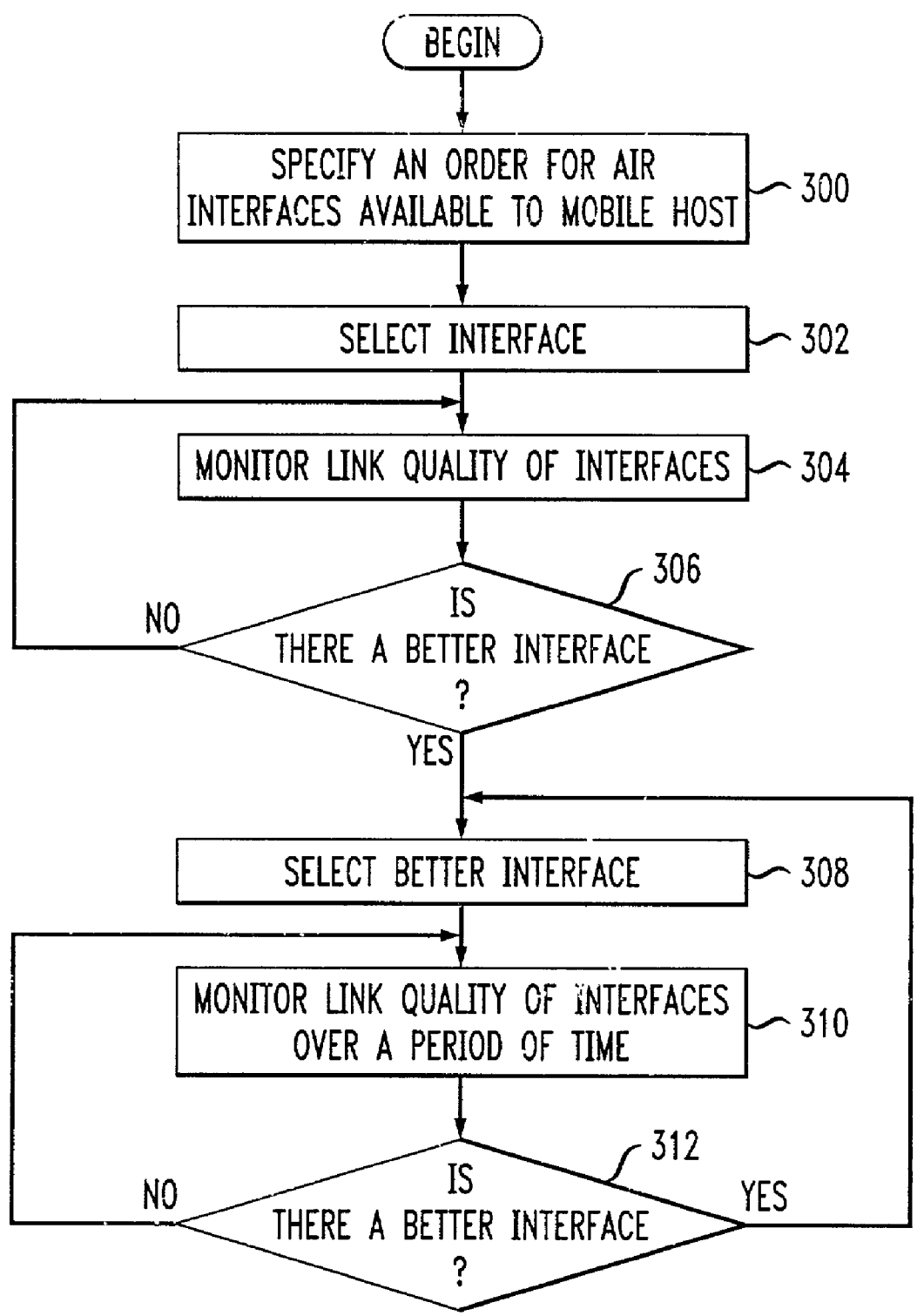
FIG. 3 is a flow diagram showing an exemplary sequence of steps for selecting an air interface in accordance with the present invention.

FIG. 3 shows an exemplary sequence of steps for selectively activating first and second air interfaces to avoid interference in accordance with the present invention. In step 300, an ordered list of air interfaces available to a given mobile host under is specified. The list can be specified by the equipment manufacturer and/or user according to predetermined criteria, such as data rate, cost and user application. It is understood that each interface can be associated with certain quality requirements in terms of signal strength, signal-to-noise level, bit error rate, throughput, etc. In step 302, an interface is selected such that the first interface on the ordered list with quality better than its requirement is selected. In an exemplary embodiment, the selected interface is then used for at least a pre-specified period of time (e.g., tens of seconds) to avoid constant switching among interfaces. While using the selected interface, at step 304 the link quality is monitored at specified intervals. In another embodiment, the link quality for available channels is monitored when the link quality for the selected air interface falls below the associated link quality criteria.

In step 306, it is determined whether a better interface exists based upon the link quality monitoring of step 304. If not, the selected interface is maintained until the session ends, until a predetermined time interval expires, or its quality falls below the associated signal requirement as measured in the monitoring during step 304. If a better interface exists, in step 308 the better interface is selected and the link quality is monitored over time in step 310. In step 312 it is determined whether a better interface exists. If not, the current interface is maintained and monitored in step 310. If so, the better interface is selected in step 308.

It is understood that the term "better interface" generally refers to an interface having a better relative quality than the currently selected interface. In one embodiment, better interface refers to an alternative interface that exceeds its associated link quality requirements when the currently selected interface does not meet its link quality requirements. However, it is understood that a wide range of technical variations for a particular application can be implemented without departing from the present invention. For example, switching from the current interface can require a signal quality for an alternate interface that is "better" by a predetermined margin so as to minimize switching between interfaces. In addition, the link quality can be required to be "better" for a given time duration or number of monitoring cycles. Further such alternative embodiments will be readily apparent to one of ordinary skill in the art.

Figure 4:
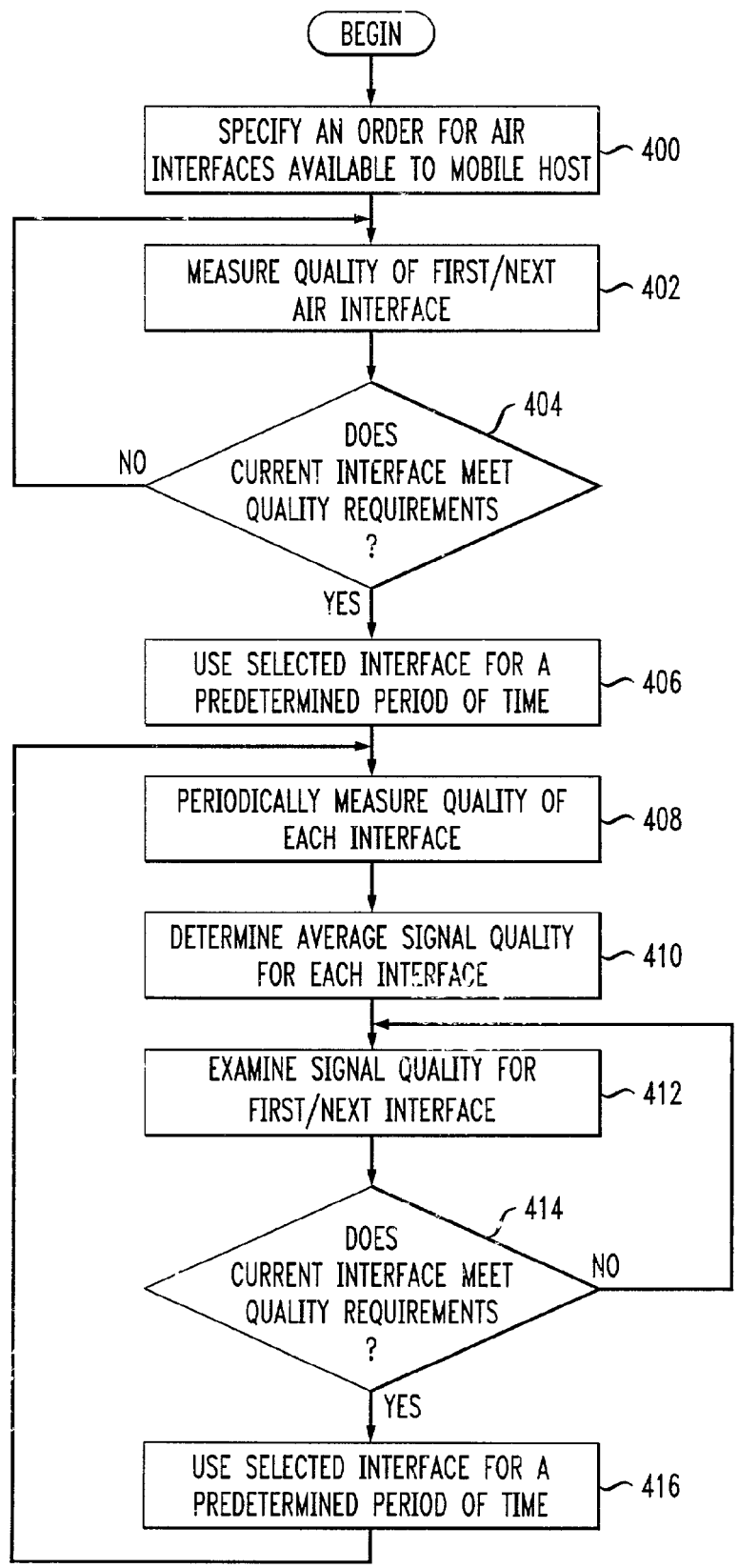
FIG. 4 is a flow diagram showing a further exemplary sequence of steps for selecting an air interface in accordance with the present invention.

FIG. 4 shows an exemplary sequence of steps for implementing an alternative interface selection technique in accordance with the present invention. In step 400, an ordered list of available interfaces for the mobile host is specified. In step 402, after the user initiates a session, the quality of available interfaces is measured starting from the first one on the ordered list. It is determined in step 404 whether the first interface meets the predetermined quality requirement. If not, the next available interface signal quality is monitored in step 402 and examined in step 404. If the interface did meet the signal quality requirement, then in step 406 the interface is selected and used for a predetermined amount of time. In step 408, the signal qualities of the available interfaces are measured periodically and average signal qualities are determined in step 410. It is understood that average signal quality is to be construed broadly to encompass characterizing signal quality over time. Exemplary averaging techniques include windowing and exponential averaging. In step 412, the average signal quality for the first interface in the ordered list is examined. It is determined in step 414 whether the average signal quality meets a predetermined threshold. If so, the first interface is selected in step 416 and used for a predetermined amount of time, e.g., tens of seconds, as the signal quality for the available interfaces are periodically measured in step 408.

If the first interface did not meet the signal quality requirement as determined in step 414, the next interface in the ordered list is examined in step 412. In step 414, it is determined whether the signal quality of the interface under consideration meets its quality requirement. This process continues until an interface is examined and determined to meet its signal quality requirement.

In comparing the interface selection technique of FIG. 3 (first technique) and of FIG. 4 (second technique), it can be seen that the first technique activates one interface at a time;

thus internal interference does not occur. However, it is possible that signal outages can occur during which no service is provided to the mobile host as it switches to another interface. Delays can occur since the quality of other interfaces is evaluated after the interface in use fails to meet its quality requirement. In addition, delays can also occur due to the authentication, authorization and accounting (AAA) process as selection of the new interface is finalized.

Outage periods can be minimized by the second technique since it maintains signal quality information for the interfaces available to the mobile host, thereby shortening the switchover time to a new interface. In addition, it is also possible to initiate the AAA process in anticipation of a failure of the interface currently in use. However, internal interference should be avoided/mitigated since multiple interfaces may be activated simultaneously.

Figure 5:
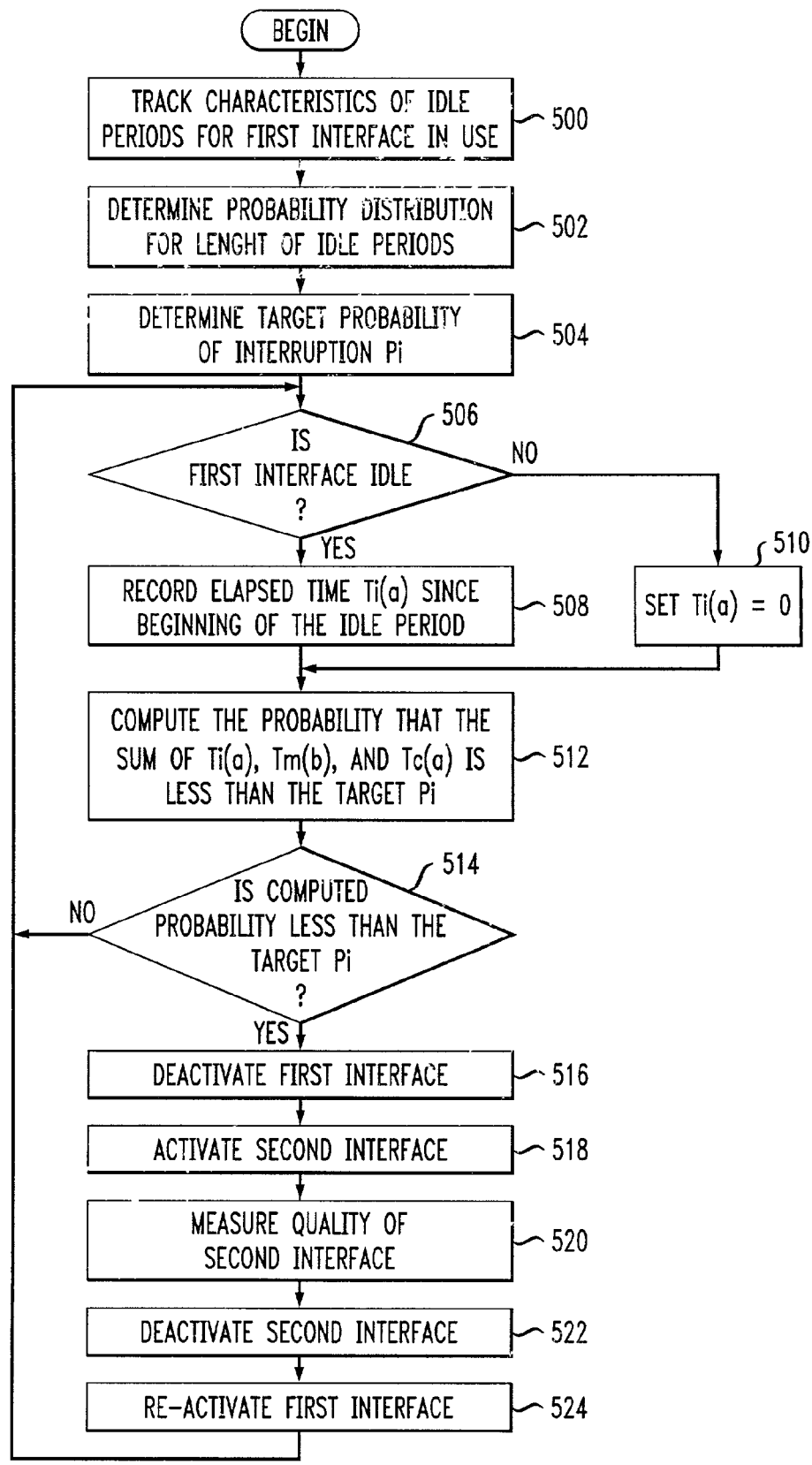
FIG. 5 is a flow diagram showing another exemplary sequence of steps for selecting an air interface in accordance with the present invention.

FIG. 5 shows an exemplary sequence of steps for scheduling access to multiple interfaces so as to minimize internal interference. An interface is said to be inactive when it is not receiving or transmitting data. The time period during which an interface remains inactive continuously is referred to as an idle period. Idle period information can be monitored and collected for the interface in use during normal data reception and transmission. In addition, activating an interface, measuring its quality (e.g., signal strength and signal-to-noise level) and subsequently deactivating it require a certain amount of time. A minimum time for such activity can be referred to as the measurement time Tm(a) for interface a. The minimum amount of time required for activation and deactivation of interface a can be referred to as the activation time Tc(a). Statistics for idle periods of the interface in use are collected and stored and, based upon the statistics, the approximated probability distribution for the length of idle periods associated with the interface can be obtained, as described in detail below. The idle period statistical information can be compared to a target level (e.g., 1 to 5%) to minimize the probability that data reception and transmission via the interface in use are interrupted due to activation of another interface for measuring its quality. Let the target probability of interruption be denoted by Pi. Assume that a first interface (a) is to be used for data reception and transmission for the second technique (FIG. 4) described above and the quality of a second interface (b) should be monitored.

In step 500, wherein the first interface (a) is currently idle, the elapsed time since the beginning of this idle period is measured. Let this elapsed time be Ti(a). If the interface is active at this point in time, Ti(a) is set to be zero. In step 502, the probability distribution for the lengths of idle periods for the first interface is determined. A target probability of interruption Pi is established in step 504. It is understood that the target probability corresponds to the probability that data reception and transmission via the interface in use will be interrupted due to activation of another interface for quality measurements.

When the signal quality of the second interface (b) is scheduled for quality measurement, in step 506 it is determined whether the first interface is idle. If so, the time elapsed Ti(a) since the beginning of the idle period is recorded in step 508. If the first interface is active (not idle), in step 510 the elapsed time Ti(a) is set to zero, i.e., Ti(a)=0. Based upon the probability distribution for the idle period associated with the first interface (a), in step 512 the system computes the probability of interruption Paip that the sum of the elapsed idle time Ti(a), the measurement time Tm(b), and the activation time Tc(a) is larger than the duration of an arbitrary idle period.

In step 514, it is determined whether the computed probability of interruption Paip is less than the target probability of interruption Pi. If so, the processor or controller deactivates the first interface (a) in step 516, activates the second interface (b) in step 518, measures the signal quality of the second interface (b) in step 520, deactivates the second interface (b) in step 522, and re-activates the first interface (a) in step 524.

If the computed probability was not less than the target interruption probability Pi, then after the first interface finishes the current active period, processing continues at step 506 where it is determined whether the first interface is idle.

It is understood that the interface access scheduling technique described above can be modified in a variety of ways readily understood by one of ordinary skill in the art without departing from the present invention. For example, the technique can be provided in alternative embodiments with additional information available to the controller. For example, if the processor or controller has access to status information and specifically finds that there is data traffic pending for transmission via the first interface (a) onto the access network, elapsed time examination can be postponed until the outgoing data is transmitted. Thus, the quality measurement of the second interface (b) is delayed to avoid intervention with the data transmission of the first interface (a).

As a further illustration, if the controller has information from the MAC (multiple-access control) protocol regarding data reception from the access network via the first interface (a), it may estimate when data starts to arrive. In this case, the quality measurement, and associated interface activation and deactivation, can be performed if they can be completed before the start of next data reception.

The present invention provides a system that enhances the Internet roaming ability of users by enabling the users to utilize multiple access networks to communicate with a target network. The access network providing the higher quality signal can be selected. The signal quality of alternative access networks can be monitored with internal interference minimized. In contrast, with conventional single transceiver devices tuned to different frequency bands at different times to avoid severe internal handset interference, the present invention allows the selection of one interface for each access network and asynchronous operation among the interfaces.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of selectively accessing a plurality of wireless access networks, comprising:

measuring a link quality of a first one of the plurality of wireless access networks via a first interface module;

selecting the first interface module for use if predetermined link quality criteria for the first one of the plurality of wireless networks are met;

determining average link qualities for the plurality of wireless access networks measured over a period of time;

examining the average link qualities;

selecting a second interface module for communicating over a second one of the plurality of wireless access networks that has an associated average link quality that meets associated link quality criteria;

scheduling communication over the first and second interface modules to access the plurality of wireless access networks;

determining a target probability of interruption for using the first interface module;

determining whether the first interface module is idle and setting an elapsed time to zero if the first interface module is active and measuring an elapsed time of an idle period if the first interface module is idle; and determining a first probability that a sum of the elapsed idle time, a measurement time to measure signal quality, and an interface activation time is larger than a duration of an arbitrary idle period based upon a probability distribution for the idle period.

2. The method according to claim 1, further including determining whether the first probability is less than the target probability.

3. The method according to claim 2, further including, if the first probability is less than the target probability, deactivating the first interface module, activating a second interface module for accessing a further one of the plurality of wireless access networks, measuring a signal quality of the further network, deactivating the second interface module, and re-activating the first interface module.

* * * * *